S. O. THOMPSON.
AUTOMATIC WATER CUT-OFF.
APPLICATION FILED NOV. 4, 1912.

1,075,675.

Patented Oct. 14, 1913.

2 SHEETS—SHEET 1.

Witnesses

Samuel O. Thompson,
Inventor by

Attorneys

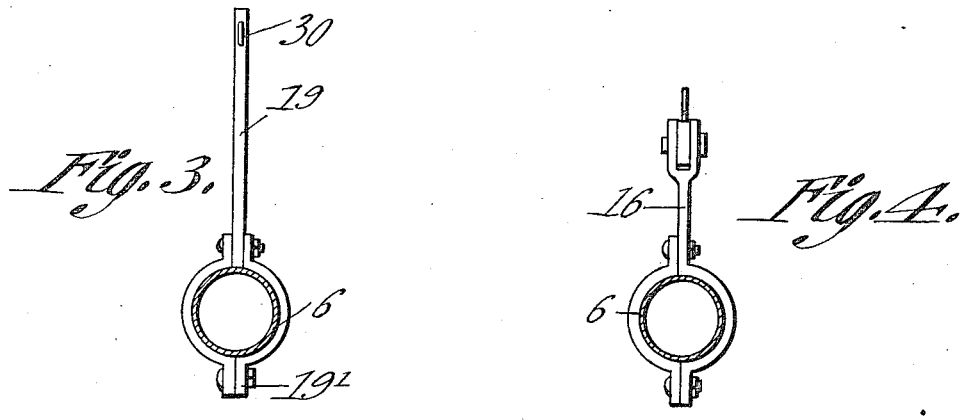
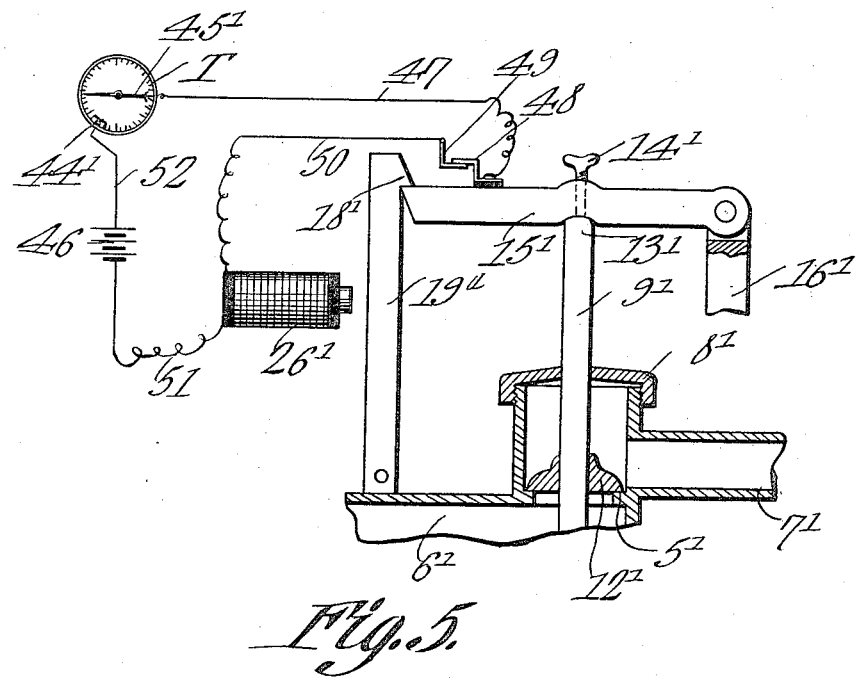

UNITED STATES PATENT OFFICE.

SAMUEL O. THOMPSON, OF MAXTON, NORTH CAROLINA, ASSIGNOR OF FORTY ONE-HUNDREDTHS TO RUFUS M. WILLIAMS, OF MAXTON, NORTH CAROLINA.

AUTOMATIC WATER CUT-OFF.

1,075,675.  Specification of Letters Patent.  Patented Oct. 14, 1913.

Application filed November 4, 1912. Serial No. 729,541.

*To all whom it may concern:*

Be it known that I, SAMUEL O. THOMPSON, a citizen of the United States, residing at Maxton, in the county of Robeson and State of North Carolina, have invented a new and useful Automatic Water Cut-Off, of which the following is a specification.

The present invention relates to improvements in an automatic water cut off, the primary object of the present invention being the provision of a novel form of valve and actuating mechanism whereby the flow of water from the main to a distributing conduit, as for instance, a supply pipe to a residence or building is automatically actuated due to the fall of temperature that may tend to freeze the water within the distributing conduit and consequently burst the pipe, such controlling mechanism being actuated by a thermostatically controlled means entirely automatic in operation.

A still further object of the invention is the provision of a valve connection adapted to be disposed between the main and the distributing conduit and carrying a vertically slidable stem with a plurality of valves, one of which valves is adapted to be closed to prevent the overflow of water when the water is being distributed from the main to the distributing conduit, while the other valve is adapted to close the supply of water from the main and permit the water within the building and distributing conduit to flow backward and out of the overflow conduit so that the pipes in the residence or building will be automatically emptied.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
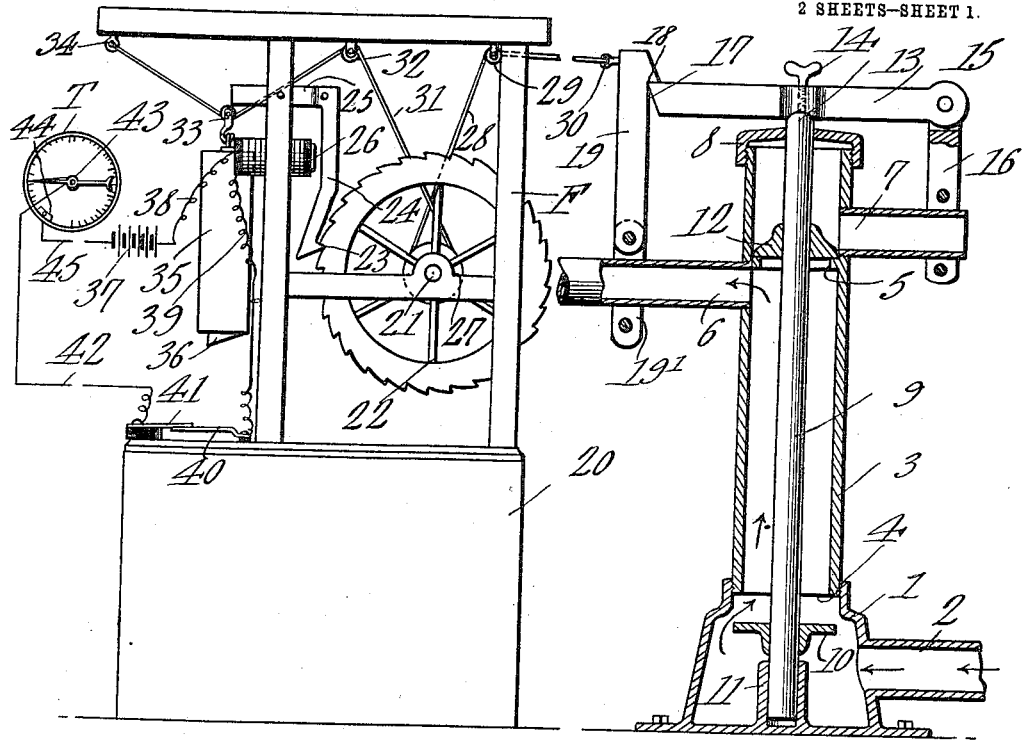
Figure 2:
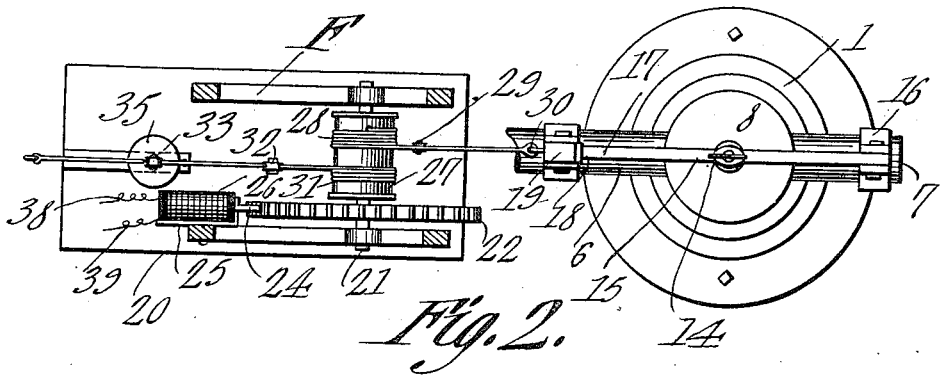

In the drawings—Figure 1 is a vertical central sectional view of the casing interposed between the main and the distributing conduit with the parts in their position, the electro-magnetically controlled means being shown in side elevation. Fig. 2 is a top plan view of the device as shown in Fig. 1, a portion of the frame supporting the valve actuating mechanism being shown in cross section. Figs. 3 and 4 are detail views of the various clamps used in connection with the distributing and overflow conduits respectively. Fig. 5 is a diagram illustrating a modified mechanism for actuating the valve.

Referring to the drawings, the numeral 1 designates the base of the present device which is adapted to be disposed between the inlet or main conduit 2, said base forming a chamber and having upstanding therefrom a vertical column or tube 3 which is in communication with the base and forms one of the communicating mediums for permitting the water to flow upwardly therethrough beyond the lower valve seat 4 and when desired through the valve seat 5 disposed within the column 3. Led from the column 3 at one side is the distributing conduit 6, which is connected to the various pipes for supplying water to a building or residence, while leading from the column 3 above the conduit 6, is an overflow conduit 7, which when the seat 5 is unoccupied will permit the draining of the conduit 6 and the pipes within the residence or building.

Mounted upon the upper end of the column 3 is a cap 8, and mounted for vertically sliding movement within the cap 8 and the full length of the column 3 is a stem 9, whose lower end is mounted within the socketed port 11, and which carries the lower valve 10 for coaction with the seat 4, and the upper valve 12 for coaction with the valve seat 5. These valves are so disposed upon the stem that one will be closed when the other is opened, and when in the position, as shown in Fig. 1, permits the passage of the water as indicated by arrows from the conduit 2 through the distributing conduit 6.

The upper end 13 of the valve stem 9 under normal conditions, that is when held in the position, as shown in Fig. 1, is engaged by the adjusting screw 14 carried by the lever 15, said lever 15 being pivoted to the clamp 16 which is mounted upon the overflow conduit 7 and has its free end 17 disposed to engage or be engaged by the hooked end 18 of the locking catch 19, said catch 19 being mounted pivotally to the clamping member 19′ mounted upon the conduit 6. These respective clamps 16 and 19′ are clearly shown in Figs. 4 and 3 respectively.

In order to provide an automatic means which will be controlled by the temperature to release the catch 19 and thereby permit the valve stem 9 to be elevated, due to the pressure of the water below the lower valve 10 from the main 2, to place the valve 10 upon the seat 4 and elevating valve 12 above the seat 5, thus cutting off the supply of water from the conduit 2 to the column 3 and conduit 6, and permitting the water by gravity contained in the conduits led from the conduit 6 and not shown, to drain backward through the conduit 6 into the column 3, through the valve seat 5 and through the overflow conduit 7, the base 20 is provided and has mounted thereupon, a suitable framework F. This framework has journaled therein a shaft 21, which carries the large toothed ratchet wheel 22 which has disposed in locking engagement therewith the vertically swinging armature pawl 24, whose hooked end 25 is disposed to engage one tooth at a time of the toothed ratchet wheel 22 and thus retain the same in the desired position. This armature pawl 24 is supported upon the bracket 25 connected to the frame F, as clearly shown in Fig. 1. Also connected to the frame and held in attractive relation to the armature pawl 24 is an electromagnet 26, the operation of which will presently be set forth.

Mounted upon the shaft 21 to one side of the ratchet wheel 22 is a spool 27. Connected to the spool which in reality forms a reel for winding the same, is a flexible connection or cord 28, which is passed over and through the pulley 29 and has its other terminal connected to the eye 30 at the upper end of the trigger catch 19. This cord is wound upon the spool or drum 27 and normally assumes the position, as shown in Fig. 1, and in order to impart rotation to the spool 27 another flexible connection or cord 31 has one terminal connected to said spool and is wound thereupon, the other terminal being led away from the spool and over the pulley 32 and under the weight carrying pulley 33 and connected to the eye 34, supported in the frame F. The weight carrying pulley 33 carries a weight 35, which is in reality a motor for rotating the wheel 22 in the direction of the arrow Fig. 1 when the electromagnet 26 is energized to attract the armature pawl 24 and thus release the ratchet wheel 22. Disposed upon the lower end of the weight 35 is a switch operating projection 36, the purpose of which will presently appear.

In order to automatically energize the electromagnet 26, an electrical circuit is provided and comprises the battery or other source of electrical energy 37, which has led away therefrom at one side, the conductor 38 which is connected to the electromagnet 26, the conductor 39 which is led from the electromagnet 26 to the movable spring terminal 40 of the switch mounted upon the base 20 and insulated therefrom, the said switch contact 40 being disposed so as to normally engage the stationary contact 41 also mounted upon the base and insulated therefrom, the conductor 42 led from the stationary contact 41, to the pointer arbor 43 of the thermometer T, the movable contact 44 which is connected adjustably to and insulated from the dial of the thermometer, and the conductor 45 led to the opposite side of the battery 37. Thus under normal conditions the pointer of the thermometer will maintain the circuit open, and as soon as the temperature falls to a low indication, for instance 34° Fahr., the pointer will engage the contact 44 and thus close the circuit so that the electromagnet 26 will be energized and the armature pawl 24 attracted thereby to release the sprocket wheel 22 to the action of the weight 35. The action of the weight 35 descending, will rotate the spool 27 and toothed wheel 22 in the direction of the arrow Fig. 1, and consequently wind the cord 28 upon the spool 27 and pull the upper free end of the trigger or catch 19 from engagement with the lever 15, which frees the valve stem 9 to the action of the water pressure below the valve 10, so that the valve stem 9 is elevated, closing the lower valve 10 upon the seat 4 and opening the valve 12 relatively to the seat 5. By this means, the water contained in the conduit 6 and the other conduits fed thereby is automatically drained by flowing by gravity into the column 3 and out of the overflow conduit 7. Thus the pipes within the house or building are protected against freezing and the consequent bursting.

In order to provide a means to prevent injury to the battery 37 when the weight 35 has moved to its lowermost position, the switch actuating lug 36 will engage the spring contact 40 which will be depressed downwardly and out of engagement with the contact plate 41, the same being held in such position until the spring controlled motor is again set for the automatic release of the lever 15 and valve stem 9.

In the form of apparatus shown in Fig. 5, the weight controlled motor is dispensed with, and a simple electrical connection controlled by the thermometer T is employed. In this case the lever 15′, which is similar to the lever 15 as shown in Fig. 1 and is held locked by the trigger 19$^a$ similar to the trigger 19, as heretofore described, will hold the valve stem 9′ downwardly or in the position as shown in Fig. 1. The trigger 19$^a$ in this instance is in reality an armature for the electromagnet 26′ which is disposed to attract the same when the contact at 44' and the pointer 45' of the thermometer T are closed. The circuit thus completed will be as follows: the contact at points 44' and 45', the conductor 47, the contact 48 connected to and insulated from the lever 15', the stationary contact 49, disposed to be engaged by the contact 48, the conductor 50, the electromagnet 26', the conductor 51, the batteries 46, the conductor 52 and the pointer 45'. Under these conditions when this circuit is energized, the movement of the armature catch 19$^a$ will release the lever 15', and the action of the pressure actuated stem 9', will cause the switch constituted by the contacts 48 and 49 to be opened, due to the vertical or upward movement of the contact 48 away from the contact 49. Thus with the simultaneous release of the armature 19$^a$ due to the energization of the electromagnet 26', the circuit will be opened so that the batteries will not be destroyed, but not until after the armature trigger 19$^a$ has been operated to release the lever 15'.

From the foregoing description, taken in connection with the drawings it is evident that with a device constructed according to the present invention, that the valve connection between the main 2 and the distributing conduit 6 may be placed within or just without the building line of a house or residence, and that the operating mechanism will also be placed adjacent to the column 3, so that the falling temperature at such point which would endanger the freezing of the water in the distributing conduit 6, will be actuated automatically and will thereby cut off the supply of water to the conduit 6 from the main 2 and at the same time permit of the automatic draining of the pipes within the house through the overflow conduit 7.

What is claimed is:

1. The combination with a casing having a pressure fluid inlet conduit, a distributing conduit, and an overflow conduit; a valve stem mounted for sliding movement within the casing, a valve mounted upon said stem between the inlet conduit and the distributing conduit for controlling the flow of pressure fluid into the casing; a second valve upon the stem interposed between the distributing conduit and the overflow conduit, one of said valves being closed when the other is opened; a lever operably disposed above the upper end of the stem; and a pivoted trigger disposed in the path of the lever and normally engaging the same to hold the overflow conduit valve closed and the admitting valve open; of a thermostatically controlled means for releasing the trigger to permit the closure by pressure of the valve between the inlet conduit and the distributing conduit and the opening of the valve between the distributing conduit and the overflow conduit.

2. The combination with a casing having a pressure fluid inlet conduit, a distributing conduit, and an overflow conduit, a valve stem mounted for sliding movement within the casing, a valve mounted upon said stem between the inlet conduit and the distributing conduit for controlling the flow of pressure fluid into the casing; a second valve upon the stem interposed between the distributing conduit and the overflow conduit, one of said valves being closed when the other is opened; a lever operably disposed above the upper end of the stem; and a pivoted trigger disposed in the path of the lever and normally engaging the same to hold the overflow conduit valve closed and the admitting valve open; of a thermostatically controlled means for releasing the trigger to prevent the admitting valve to close and the overflow valve to open, including a source of electrical energy, a thermometer, an electromagnet, and a circuit including the source of electrical energy, the pointer of the thermometer and the electromagnet.

3. The combination with a casing having a pressure fluid inlet conduit, a distributing conduit, and an overflow conduit, a valve stem mounted for sliding movement within the casing, a valve mounted upon said stem between the inlet conduit and the distributing conduit for controlling the flow of pressure fluid into the casing; a second valve upon the stem interposed between the distributing conduit and the overflow conduit, one of said valves being closed when the other is opened; a lever operably disposed above the upper end of the stem; a pivoted trigger disposed in the path of the lever and normally engaging the same to hold the overflow conduit valve closed and the admitting valve open; of a thermostatically controlled means for releasing the trigger to permit the admitting valve to close and the overflow valve to open, a thermometer, an electromagnet, a circuit including the source of electrical energy, the pointer of the thermometer and the electromagnet, and a switch in said circuit normally closed, and disposed so as to be opened upon the release of the lever.

4. The combination with a casing, having a pressure fluid inlet conduit, a distributing conduit, and an overflow conduit, a pressure actuated valve for closing the inlet conduit and opening the overflow conduit and means for normally holding the valve against the pressure so as to open the inlet conduit and close the overflow conduit; of a thermostatically controlled means for releasing the last means, including a weight controlled motor, an electromagnet, an armature lock under the influence of the electromagnet for holding the motor in normal condition, a source of electrical energy, a thermometer having an indicating pointer, an adjustable point carried by the thermometer in the path of its indicating pointer, a circuit including the source of electrical energy, indicating pointer of the thermometer and the adjustable point, and the electromagnet.

5. The combination with a casing having a pressure fluid inlet conduit, a distributing conduit, and an overflow conduit, a valve stem mounted for sliding movement within the casing, a valve mounted upon said stem between the inlet conduit and the distributing conduit for controlling the flow of pressure fluid into the casing; a second valve upon the stem interposed between the distributing conduit and the overflow conduit, one of said valves being closed when the other is opened; and means for normally holding the stem with the first mentioned valve open and the second mentioned valve closed; of a thermostatically controlled means for releasing the last means including a weight controlled motor, an electromagnet, an armature lock under the influence of the electromagnet for holding the motor in normal condition, a source of electrical energy, a thermometer having an indicator pointer, an adjustable point carried by the thermometer in the path of its indicating pointer, and a circuit including the source of electrical energy, indicating pointer of the thermometer, the adjustable point, and the electromagnet.

6. The combination with a casing having a pressure fluid inlet conduit, a distributing conduit, and an overflow conduit; a valve stem mounted for sliding movement within the casing, a valve mounted upon said stem between the inlet conduit and the distributing conduit for controlling the flow of pressure fluid into the casing; a second valve upon the stem interposed between the distributing conduit and the overflow conduit, one of said valves being closed when the other is opened; a lever operably disposed above the upper end of the stem; and a pivoted trigger disposed in the path of the lever and normally engaging the same to hold the overflow conduit valve closed and the admitting valve open; of a thermostatically controlled means for releasing the trigger to permit the closure by the pressure fluid of the valve between the inlet conduit and the distributing conduit and the opening of the valve between the distributing conduit and the overflow conduit, including a weight controlled motor, an electromagnet, an armature lock under the influence of the electromagnet for holding the motor in normal condition, a source of electrical energy, a thermometer having an indicator pointer, an adjustable point carried by the thermometer in the path of its indicating pointer, and a circuit including the source of electrical energy, indicating pointer of the thermometer, the adjustable pointer, and the electromagnet.

In testimony that I claim the foregoing as my own, I have hereto affixed my signature in the presence of two witnesses.

SAMUEL O. THOMPSON.

Witnesses:
J. S. Russell,
Bessie Williams.

---

Copies of this patent may be obtained for five cents each, by addressing the "Commissioner of Patents, Washington, D. C."